US012573641B2

(12) United States Patent
Hong et al.

(10) Patent No.: US 12,573,641 B2
(45) Date of Patent: Mar. 10, 2026

(54) FUEL CELL STACK INCLUDING A SEPARATOR HAVING A GAS EQUAL DISTRIBUTION STRUCTURE

(71) Applicant: INDUSTRY-ACADEMIC COOPERATION FOUNDATION, YONSEI UNIVERSITY, Seoul (KR)

(72) Inventors: Jong Sup Hong, Seoul (KR); Woo Seok Lee, Goyang-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 559 days.

(21) Appl. No.: 18/054,712

(22) Filed: Nov. 11, 2022

(65) Prior Publication Data

US 2023/0145403 A1 May 11, 2023

(30) Foreign Application Priority Data

Nov. 11, 2021 (KR) ........................ 10-2021-0154927
Mar. 28, 2022 (KR) ........................ 10-2022-0038059

(51) Int. Cl.
*H01M 8/0258* (2016.01)
*H01M 8/12* (2016.01)
(Continued)

(52) U.S. Cl.
CPC ....... *H01M 8/0258* (2013.01); *H01M 8/2425* (2013.01); *H01M 8/2475* (2013.01); *H01M 2008/1293* (2013.01)

(58) Field of Classification Search
None
See application file for complete search history.

(56) References Cited

U.S. PATENT DOCUMENTS 6,096,450 A * 8/2000 Walsh ................. H01M 8/0263
429/513
2007/0200277 A1* 8/2007 Spencer .............. H01M 8/0258
264/319

(Continued)

FOREIGN PATENT DOCUMENTS

JP 2004253366 A * 9/2004
JP 2009-245892 A 10/2009

OTHER PUBLICATIONS

Office Action received in Korean Application No. 10-2022-0038059 dated Jul. 12, 2024.

*Primary Examiner* — Scott J. Chmielecki
(74) *Attorney, Agent, or Firm* — Knobbe, Martens, Olson & Bear, LLP

(57) ABSTRACT

A fuel cell stack including a separator having a gas equal distribution structure includes a cell formed by sequentially stacking an air electrode, an electrolyte, and a fuel electrode, an air electrode current collector, an air electrode separator, a fuel electrode current collector, and a fuel electrode separator. The air path or the fuel path includes a first channel through which the air or the fuel is introduced from the outside and which is formed to extend to a predetermined length, an auxiliary channel branched off from the first channel so that the air or the fuel moves from the first channel, and a second channel connected to an end portion of the auxiliary channel and formed to extend to a predetermined length so that the air or the fuel moved from the auxiliary channel is moved and discharged to the outside.

14 Claims, 8 Drawing Sheets

(51) Int. Cl.
    *H01M 8/2425*     (2016.01)
    *H01M 8/2475*     (2016.01)

(56)              References Cited

U.S. PATENT DOCUMENTS

| | | | |
|---|---|---|---|
| 2008/0038622 A1* | 2/2008 | Valensa ............... | H01M 8/0258 |
| | | | 429/459 |
| 2008/0107944 A1* | 5/2008 | Goebel ............... | H01M 8/0271 |
| | | | 429/457 |
| 2012/0219875 A1* | 8/2012 | Hasegawa ............. | H01M 8/241 |
| | | | 429/480 |
| 2013/0316263 A1* | 11/2013 | Roshanzamir ........ | H01M 8/026 |
| | | | 429/480 |
| 2014/0065508 A1* | 3/2014 | Darga ................. | H01M 8/0276 |
| | | | 429/457 |
| 2021/0111415 A1* | 4/2021 | Ohnishi ............. | H01M 8/2432 |

\* cited by examiner

40 : 41, 42, 43
70 : 71, 72, 73

FUEL CELL STACK INCLUDING A SEPARATOR HAVING A GAS EQUAL DISTRIBUTION STRUCTURE

CROSS-REFERENCE TO RELATED APPLICATION

This application claims priority to and the benefit of Korean Patent Application No. 10-2021-0154927, filed on Nov. 11, 2021 and Korean Patent Application No. 10-2022-0038059, filed on Mar. 28, 2022, the disclosures of which are incorporated herein by reference in their entirety.

BACKGROUND

1. Field

The present disclosure relates to a fuel cell stack, and more specifically, to a fuel cell stack including a separator having a gas equal distribution structure.

2. Discussion of Related Art

Fuel cells are devices directly convert chemical energy of sources into electrical energy through electrochemical reactions and have advantages that an energy efficiency is remarkably high compared to general thermal devices, and almost no pollutants are discharged.

SUMMARY

The present disclosure provides a fuel cell stack having a structure capable of uniformly distribute fuel and air to an entire region of a fuel cell in order to minimize degradation of the performance and durability of the fuel cell stack.

According to an aspect of the present disclosure, there is provided a fuel cell stack including a separator having a gas equal distribution structure, the fuel cell stack including a cell formed by sequentially stacking an air electrode, an electrolyte, and a fuel electrode, an air electrode current collector having one surface disposed at a side of the air electrode, an air electrode separator which is disposed at a side of the other surface of the air electrode current collector and in which an air path, along which air moves, is formed, a fuel electrode current collector having one surface disposed at a side of the fuel electrode, and a fuel electrode separator which is disposed at a side of the other surface of the fuel electrode current collector and in which a fuel path, along which fuel moves, is formed, wherein at least one of the air path and the fuel path includes a first channel through which the air or the fuel is introduced from the outside and which is formed to extend to a predetermined length, an auxiliary channel branched off from the first channel so that the air or the fuel moves from the first channel, and a second channel connected to an end portion of the auxiliary channel and formed to extend to a predetermined length so that the air or the fuel moved from the auxiliary channel is moved and discharged to the outside, and at least one of the air path and the fuel path is formed such that the air or the fuel moves in a direction toward the cell and is restricted from moving from the first channel toward the cell.

The first channel may be formed to linearly extend in one direction, and the auxiliary channel may be provided as a plurality of auxiliary channels spaced at predetermined intervals in an extending direction of the first channel.

The first channel and the second channel may be disposed in parallel.

The auxiliary channel may be provided as a plurality of auxiliary channels disposed in parallel.

The plurality of auxiliary channels may be disposed orthogonal to the first channel and the second channel.

The auxiliary channel may extend to a length smaller than an extension length of each of the first channel and the second channel.

The second channel may be disposed at each of two sides of the first channel, and the auxiliary channel may be disposed at each of the two sides of the first channel so that the air or the fuel is distributed in two side directions of the first channel.

The first channel may be provided as a plurality of first channels, the second channel may be provided as a plurality of second channels, and the plurality of first channels and the plurality of second channels may be alternately disposed.

The auxiliary channel may be formed to include a bent portion which changes an extending direction.

The air path or the fuel path may be formed so that an upper portion thereof facing the cell is open, and the fuel cell stack may further include a cover member disposed between the air electrode separator and the air electrode current collector or between the fuel electrode separator and the fuel electrode current collector to cover a region corresponding to the first channel in the upper portion.

The cover member may be formed in a plate shape manufactured separately from the air electrode separator or the fuel electrode separator, and a slit may be formed in the cover member so that the air or the fuel moves in a region corresponding to the auxiliary channel.

The slit may be formed in a shape corresponding to the auxiliary channel.

The air electrode separator and the cover member or the fuel electrode separator and the cover member may be integrally formed.

At least one of the air path and the fuel path may be formed so that the air or the fuel moves in the direction toward the cell though only the auxiliary channel.

The fuel cell stack may be a fuel cell stack for a solid oxide fuel cell.

BRIEF DESCRIPTION OF THE DRAWINGS

Not only detailed descriptions of example embodiments of the present disclosure described below but also the summary described above will be understood more easily when read with reference to the accompanying drawings. The example embodiments are illustrated in the drawings to illustrate the present disclosure. However, it should be understood that the present disclosure is not limited to the exact layout and method illustrated in the drawings, in which.

DETAILED DESCRIPTION OF EMBODIMENTS

Figure 1:
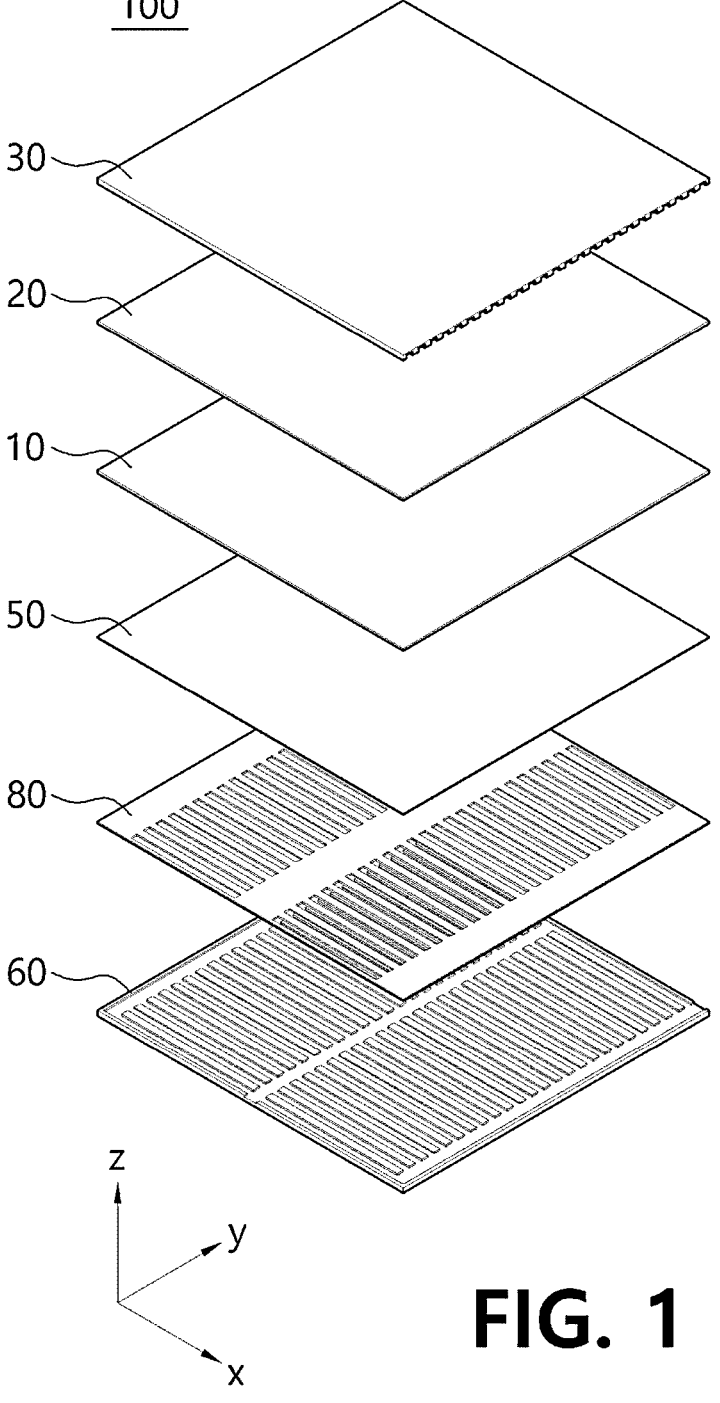
FIG. 1 is an exploded perspective view illustrating a fuel cell stack including a separator having a gas equal distribution structure according one embodiment of the present disclosure.

Hereinafter, embodiments of the present disclosure will be described in detail with reference to the accompanying drawings in order for those skilled in the art to easily perform the present disclosure. The present disclosure may be implemented in several different forms and is not limited to the embodiments described herein. Parts irrelevant to descriptions are omitted in the drawings in order to clearly explain the present disclosure, and the same or similar parts are denoted by the same reference numerals throughout this specification.

Terms and words used in this specification and claims should not be interpreted as limited to commonly used meanings or meanings in dictionaries and should be interpreted with meanings and concepts which are consistent with the technological scope of the disclosure based on the principle that the inventors have appropriately defined concepts of terms in order to describe the disclosure in the best way.

Among various fuel cells, since a solid oxide fuel cell (SOFC) operates at high temperatures of 600 to 1000° C., the SOFC can freely use not only hydrogen-based fuel but also hydrocarbon-based fuel through internal reforming without using a reformer, a fuel conversion efficiency of the SOFC reaches 45 to 65%, a system efficiency of 85% or more can be obtained in a cogeneration system using waste heat, and thus the SOFC is attracting attention as a next-generation eco-friendly electricity generation method.

More specifically, the SOFC includes an oxygen ionic conducting electrolyte, an air electrode (positive electrode) positioned at one side of the oxygen ionic conducting electrolyte, and a fuel electrode (negative electrode) positioned at the other side thereof.

In this case, in the air electrode, oxygen ions generated by a reduction reaction of oxygen move to the fuel electrode through the electrolyte and react with hydrogen supplied from the fuel electrode to generate water, in this process, electrons are generated by the fuel electrode, the electrons are consumed by the air electrode, and thus electricity flows when two electrodes are connected.

In relation thereto, since power generated by a unit cell basically including the air electrode, the electrolyte, and the fuel electrode is very small, several unit cells can be stacked to form a fuel cell stack to increase an amount of output power.

In this case, an air electrode of one unit cell needs to be electrically connected to a fuel electrode of another unit cell, and to this end, separators are used. In addition, current collectors are provided between the air electrode and the separator and between the fuel electrode and the separator to assist uniform contact between the electrodes and the separators.

Meanwhile, it may be very important to uniformly distribute fuel and air into a region in which an electrochemical reaction occurs in order to improve the performance and durability of the fuel cell.

However, in the case of the foregoing technique, there may be complete consuming/converting gas (fuel and air) at an entrance as soon as the gas is introduced, and thus a concentration of the fuel gradually decreases while the fuel moves from one end portion through which the fuel is introduced to the other end portion at an opposite side through which the fuel is discharged, and the like. That is, in the distribution structure of the foregoing technique, all electrochemical/thermochemical reactions are extremely concentrated on the entrance, and accordingly, a reaction does not occur at an exit of the gas, and thus a real reaction area of the cell is reduced. Such non-uniform reaction distribution can cause not only performance degradation but also a serious long-term durability decrease.

When a direction is mentioned in the present specification, a longitudinal direction, a width direction, and a height direction of a fuel cell stack will be respectively referred to as an X-axis direction, a Y-axis direction, and a Z-axis direction based on coordinate axes illustrated in FIG. 1. In this case, the X-axis, the Y-axis, and the Z-axis are defined to be perpendicular to each other.

Figure 2:
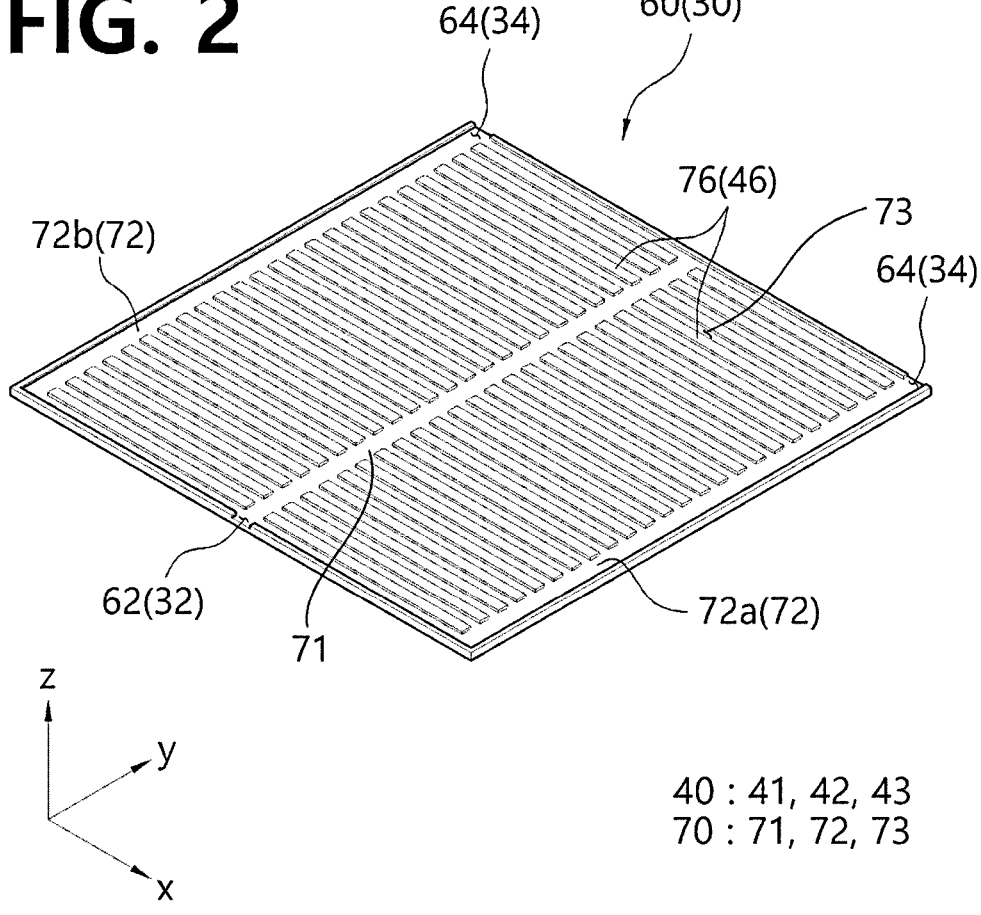
FIG. 2 is a view illustrating one example of a fuel path (or air path) formed in a fuel electrode separator (or air electrode separator) of the fuel cell stack including a separator having a gas equal distribution structure according one embodiment of the present disclosure.
Figure 3:
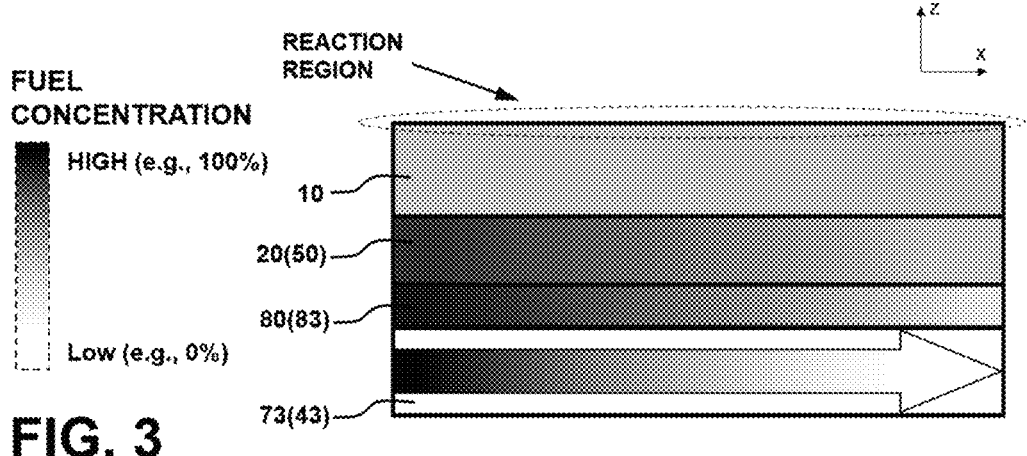
FIG. 3 is a view visually illustrating a fuel concentration in a cross section in a height direction of the fuel cell stack including a separator having a gas equal distribution structure according one embodiment of the present disclosure.
Figure 4:
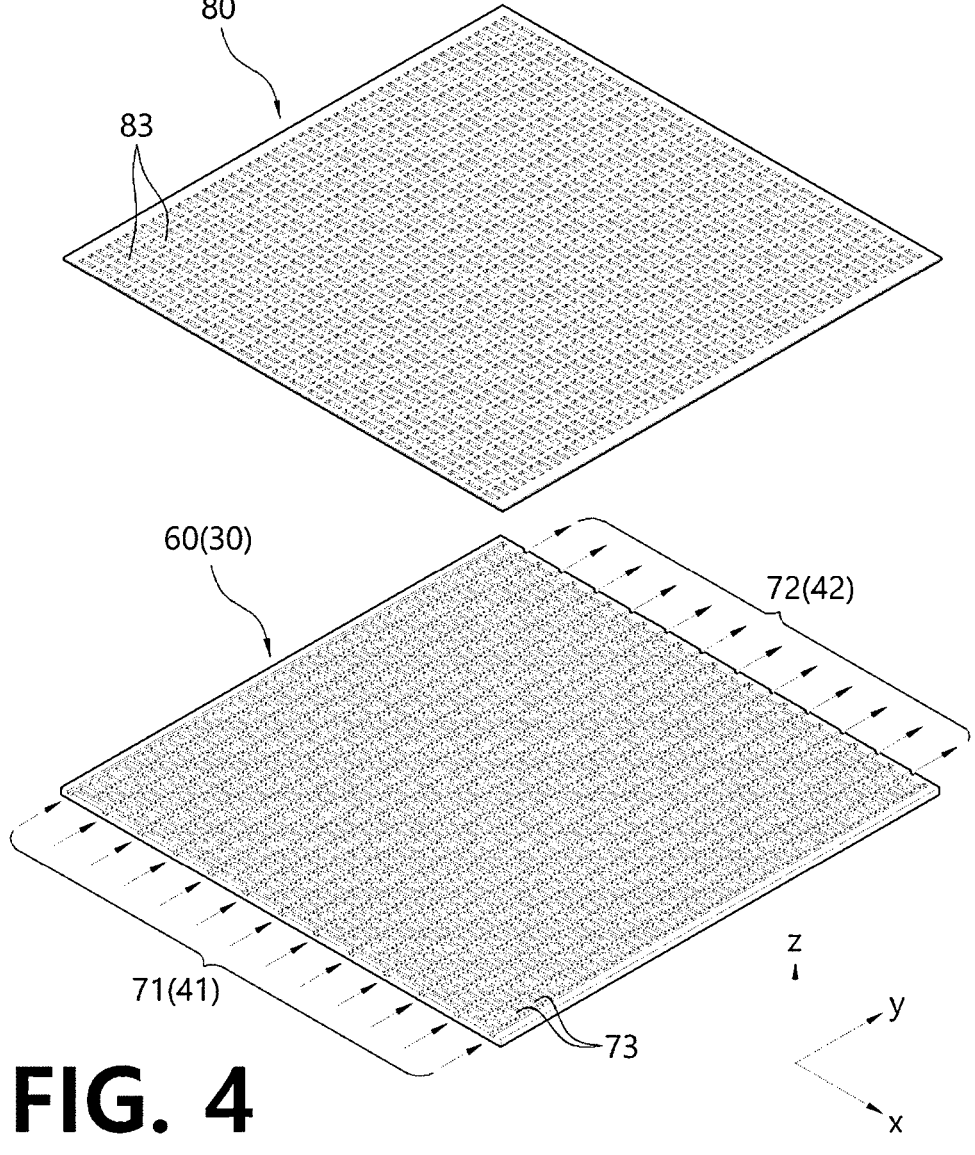
FIG. 4 is a view illustrating an example of a fuel path (or air path) formed in a fuel electrode separator (or air electrode separator) of a fuel cell stack including a separator having a gas equal distribution structure according to another embodiment of the present disclosure.
Figure 5:
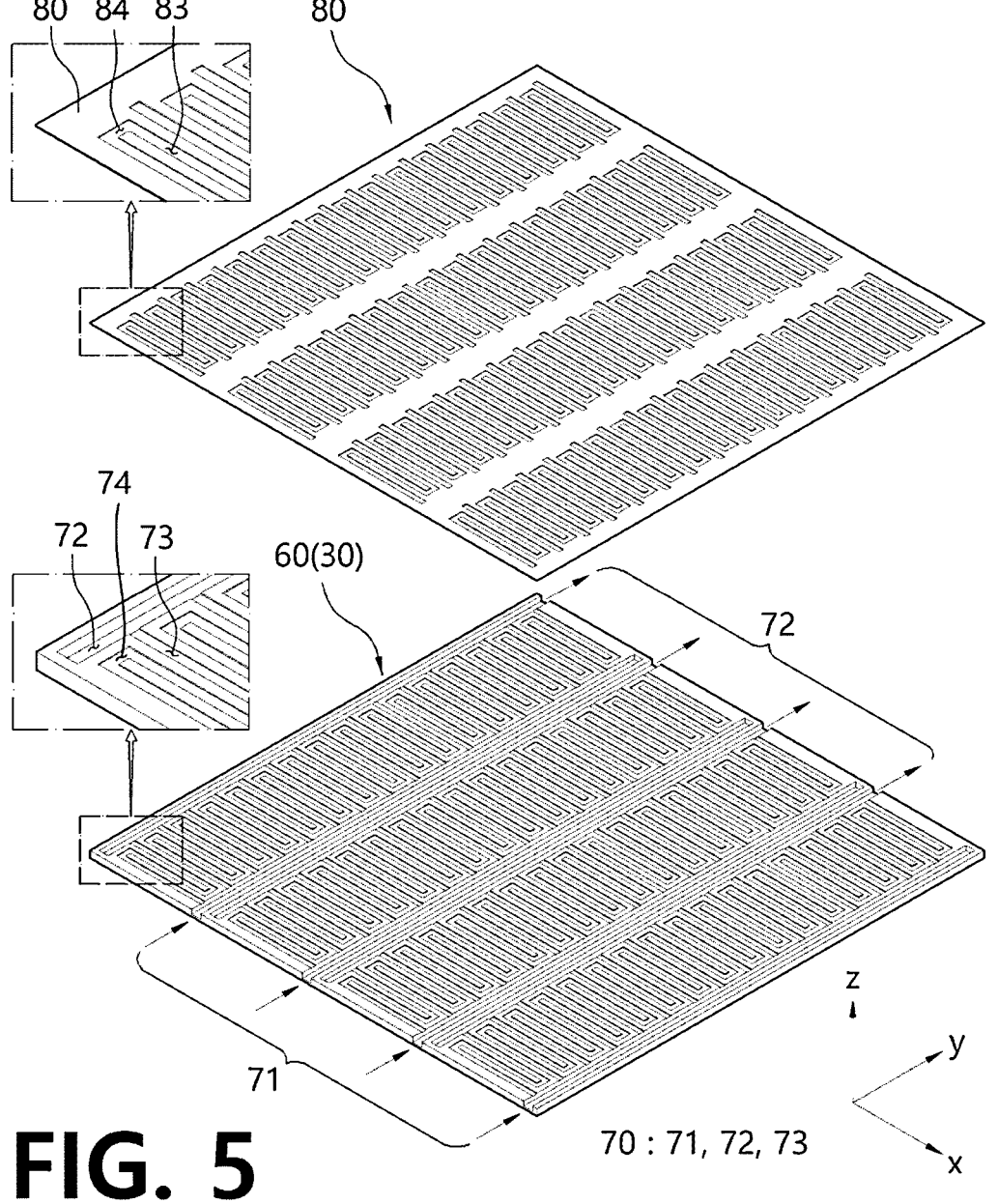
FIGS. 5 and 6 are views illustrating an example of a fuel path (or air path) formed in a fuel electrode separator (or air electrode separator) of a fuel cell stack including a separator having a gas equal distribution structure according to still another embodiment of the present disclosure.
Figure 6:
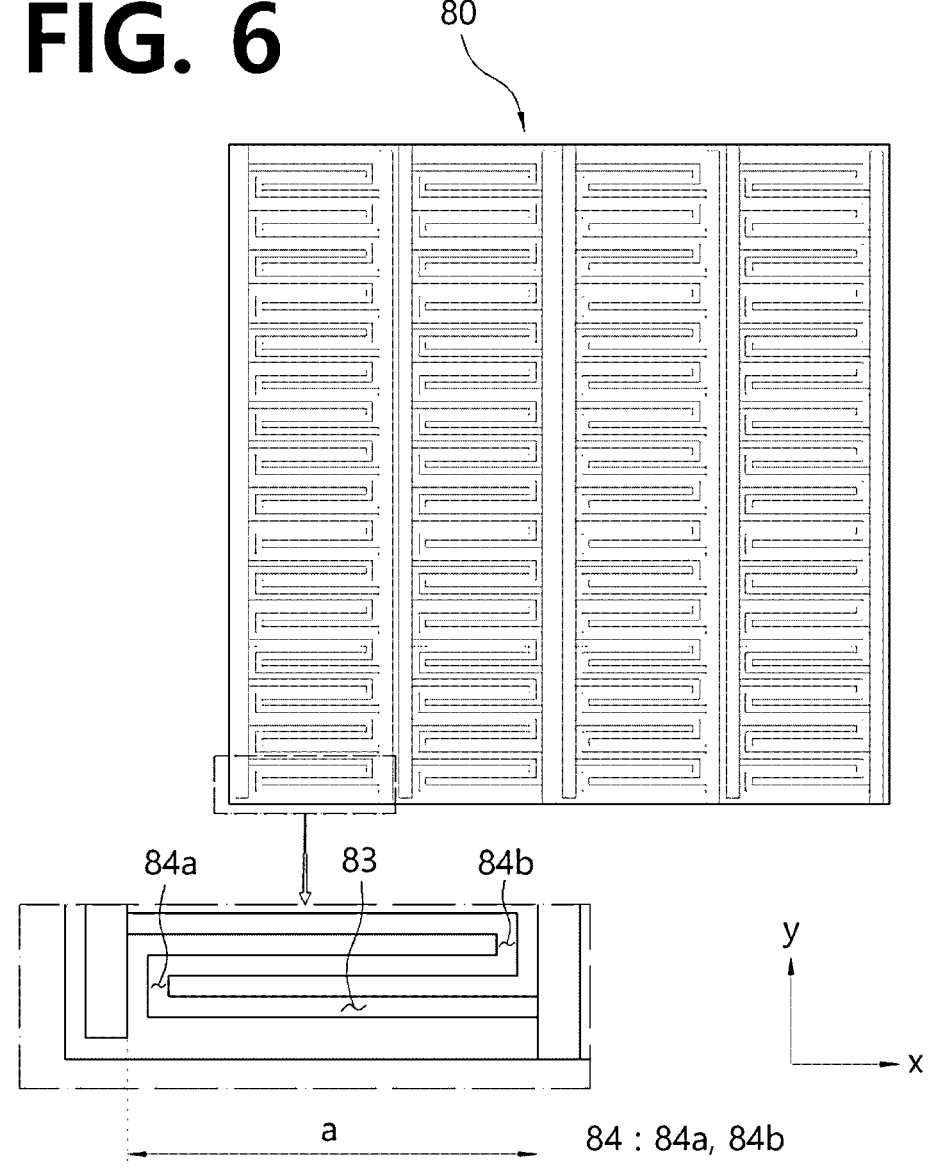

FIG. 1 is an exploded perspective view illustrating a fuel cell stack including a separator having a gas equal distribution structure according one embodiment of the present disclosure, FIG. 2 is a view illustrating one example of a fuel path (or air path) formed in a fuel electrode separator (or air electrode separator) of the fuel cell stack including a separator having a gas equal distribution structure according one embodiment of the present disclosure, and FIG. 3 is a view visually illustrating a fuel concentration in a cross section in a height direction of the fuel cell stack including a separator having a gas equal distribution structure according one embodiment of the present disclosure. FIG. 4 is a view illustrating an example of a fuel path (or air path) formed in a fuel electrode separator (or air electrode separator) of a fuel cell stack including a separator having a gas equal distribution structure according to another embodiment of the present disclosure, and FIGS. 5 and 6 are views illustrating an example of a fuel path (or air path) formed in a fuel electrode separator (or air electrode separator) of a fuel cell stack including a separator having a gas equal distribution structure according to still another embodiment of the present disclosure.

A fuel cell stack 100 including a separator having a gas equal distribution structure (hereinafter, fuel cell stack) according one embodiment of the present disclosure may be a unit cell forming a part of a fuel cell including a plurality of fuel cell stacks and may include a fuel electrode separator 60, a fuel electrode current collector 50, a cell 10, an air electrode current collector 20, and an air electrode separator 30 to may make fuel react with an oxidant to generate electrical energy.

In this case, as illustrated in FIG. 1, the fuel cell stack 100 according one embodiment of the present disclosure may be formed by sequentially stacking the separator 60, the fuel electrode current collector 50, the cell 10, the air electrode current collector 20, the air electrode separator 30 in the height direction, and fuel and air may be supplied through the fuel electrode separator 60 and the air electrode separator 30.

In this case, in the fuel cell stack 100 according one embodiment of the present disclosure, a unique path structure may be formed in the fuel electrode separator 60 and the air electrode separator 30 to uniformly distribute the fuel and the air to an entire region of the fuel cell stack, and hereinafter, the path structure will be mainly described.

First, the cell 10 may be formed by sequentially stacking a fuel electrode, an electrolyte, and an air electrode and may be a cell used in, as an example, a fuel cell stack for a solid oxide fuel cell (SOFC). However, an application of the fuel cell stack 100 according one embodiment of the present disclosure is not limited to the SOFC, and the fuel cell stack 100 can be used as various types of fuel cell stack in addition thereto.

In this case, as an example, a sheet of the cell may be formed through a process in which all of the fuel electrode, the electrolyte, the air electrode are formed of ceramic materials and sintered at high temperatures. However, the above-described materials and the manufacturing method are only examples, and the cell 10 may be formed through various materials and methods in addition thereto.

Referring to FIG. 1 again, next, the fuel electrode current collector 50 and the air electrode current collector 20 may be respectively disposed at a side of the fuel electrode and a side of the air electrode of the cell 10.

In this case, it is considered that poor contact may occur due to generation of tolerances when the cell 10 and the fuel electrode separator (or air electrode separator), which will be described below, are in surface contact with each other, and in order to prevent this, the fuel electrode current collector 50 and the air electrode current collector 20 may be disposed between the cell 10 and the fuel electrode separator 60 or between the cell 10 and the air electrode separator 30 to implement uniform contact between the members.

As an example, each of the current collectors 20 and 50 may be formed as a mesh type current collector, a foam type current collector, or the like. In this case, the mesh type current collector may serve to secure stiffness of the current collector and may be formed of a material containing at least one of, for example, stainless steel, a Fe—Cr alloy, manganese (Mn), copper (Cu), nickel (Ni), cobalt (Co), silver (Ag), and platinum (Pt). In addition, the form type current collector is for securing a current collecting function of the current collector and may have a (Mn,Cr)3O4, (Ni,Cr)3O4, (Ni,Co) 3O4, (Co,Cr)3O4 or (Co,Ni)3O4 type spinel structure. However, the current collectors 20 and 50 may be formed of various materials and in various shapes other than those.

The fuel cell stack 100 according one embodiment of the present disclosure may include the fuel electrode separator 60 and the air electrode separator 30 which are disposed on one surface of the fuel electrode current collector 50 and one surface of the air electrode current collector 20 which are opposite to the cell 10.

In this case, in the fuel electrode separator 60, a fuel path 70 serving as a path along which fuel moves may be formed, and in the air electrode separator 30, an air path 40, along which air moves after air is supplied, may be formed.

Meanwhile, since the fuel electrode separator 60 and the air electrode separator 30 only have a difference that a type of a fluid is fuel or air but have substantially the same structures and functions, in the description below, the fuel electrode separator 60 will be mainly described in order to avoid redundant descriptions. That is, a description for the air electrode separator 30 may be understood by replacing the fuel with the air in the description for the fuel electrode separator 60, and thus most of the description of the air electrode separator 30 will be omitted.

In relation thereto, a cover member 80, which will be described below, may be equally disposed at a side of the air electrode separator 30 as well as a side of the fuel electrode separator 60, and in this case, it is clear that a function and a structure of a cover member 82 disposed at the side of the air electrode separator 30 are the same as or similar to those of a cover member 81 disposed at the side of the fuel electrode separator 60.

In one embodiment of the present disclosure, the fuel path 70 may be a concave groove formed around a plurality of protrusions 76 by the protrusions 76 formed to protrude from one surface of the fuel electrode separator 60 toward the fuel electrode current collector 50. In addition, the fuel path 70 may be a space formed in the fuel electrode separator 60 when the protrusions 76 and the cover member 80, which will be described below, are disposed adjacent to each other.

Specifically, referring to FIG. 2, the fuel path 70 may include a first channel 71, a second channel 72, and an auxiliary channel 73.

First, the first channel 71 is a channel extending to a predetermined length so that fuel is introduced from the side of the fuel electrode separator 60 and is moved, and as illustrated in FIG. 2, one end portion may be connected to an inlet 62 of the fuel electrode separator 60 through which the fuel is introduced.

In this case, in an end portion of the first channel 71 opposite to the inlet 62, movement of a fluid may be blocked by the protrusion 76.

In addition, as illustrated in the drawings, the first channel 71 may be linearly formed to extend in a straight line. In this case, the first channel 71 may be formed across the fuel electrode separator 60 so that the fuel may be distributed to an entire region of the fuel electrode separator 60.

However, alternatively, the first channel 71 may be formed to include a bent portion having entirely or partially curved shape and may be formed in any shape.

Meanwhile, in FIG. 2, although one first channel 71 is illustrated as being disposed at a central portion of the fuel electrode separator 60, the first channel 71 may have any shape, and the number of first channels 71 may vary in addition thereto as long as the first channel 71 can serve as a channel through which fuel is introduced. This will be described in more detail through embodiments which will be described below.

Referring to FIG. 2 again, the fuel path 70 may include the auxiliary channel 73 formed to be branched off from the first channel 71.

In this case, the auxiliary channel 73 may be formed to communicate with one side portion of the first channel 71. Accordingly, the fuel introduced through the inlet 62 may move along the first channel 71 in a longitudinal direction, and at the same time, a part of the fuel may move in a width direction through the auxiliary channel 73 formed in a side portion.

In one embodiment of the present disclosure, the auxiliary channel 73 may have a length smaller than that of each of the first channel 71 and the second channel 72 which will be described below. For example, as in FIG. 2, the auxiliary channel 73 may be formed to have the extension length smaller than that of each of the first channel 71 and the second channel by arranging the auxiliary channel 73 to connect the first channel 71 and the second channel 72 which extend in one direction (in the drawing, a Y-axis direction).

When the auxiliary channel 73 having the smaller length than the first channel 71 is disposed as described above, as illustrated in FIG. 3, fuel diffusion of the fuel electrode current collector 50 or the cell 10 above the fuel electrode separator 60 may be expedited, and accordingly, uniformity of fuel concentration over the entire region of the fuel cell stack can be improved compared to when only the first channel 71 or the second channel 72 which has the relatively greater length is disposed.

As a specific example, as illustrated in the drawings, the auxiliary channel 73 may be disposed perpendicular to the first channel 71. In this case, the extension length of the auxiliary channel 73 may be minimized compared to the first channel 71. When the length of the auxiliary channel 73 is small as described above, there is an advantage that a fuel diffusion effect in the fuel electrode current collector 50 or the cell 10 above the auxiliary channel 73 can be maximized so that a distribution of the fuel is uniform.

However, as necessary, the auxiliary channel 73 may be branched off from the first channel 71 at a predetermined angle other than 90°. For example, the auxiliary channel 73 may be formed to obliquely extend from first channel 71 at 45° with respect to a direction in which the first channel 71 extends.

When the auxiliary channel 73 is obliquely disposed with respect to the first channel 71 as described above, the extension length of the auxiliary channel 73 may be sufficiently secured, a sufficient remaining time may be secured so that the fuel sufficiently moves in the height direction in the auxiliary channel 73, and at the same time, a reaction region having a smaller length than the first channel 71 may be provided, and thus diffusion of the fuel in a region of the current collector 50 or the cell 10 can be expedited.

In one embodiment of the present disclosure, as illustrated in FIG. 2, a plurality of auxiliary channels 73 may be disposed at predetermined intervals in the extending direction of the first channel 71. Accordingly, the fuel may be uniformly distributed in the longitudinal direction (for example, the Y-axis direction) of the fuel electrode separator 60 without being biased to any one region.

In embodiments, the plurality of auxiliary channels 73 may be disposed in parallel to uniformly distribute the fuel to the entire region of the fuel cell stack 100 as illustrated in FIG. 2.

Then, in one embodiment of the present disclosure, the fuel path 70 may include the second channel 72 connected to an end portion of the auxiliary channel 73. That is, the second channel 72 may be a channel spaced apart from the first channel 71 and may communicate with the first channel 71 through the auxiliary channel 73.

In this case, referring to FIG. 2 again, in the second channel 72, unlike the first channel 71, one end portion may be connected to an outlet 64 through which the fuel is discharged to the outside from the fuel electrode separator 60, and in the other end portion, movement of the fuel may be restricted by the protrusion 76.

Accordingly, the fuel introduced through the first channel 71 may be branched off and moved to the auxiliary channel 73, a part of the fuel may be moved to the cell 10 in the height direction and used for a reaction, and the remaining part may be ultimately moved to the second channel 72 and discharged to the outside of the fuel electrode separator 60 through the outlet 64.

In one embodiment of the present disclosure, as an example, the second channel 72 may be disposed parallel to the first channel 71. Accordingly, a distance between the first channel 71 and the second channel 72 may be uniformly maintained, and thus lengths of the plurality of auxiliary channels 73 disposed between the first channel 71 and the second channel 72 may also be uniformly maintained to improve uniformity of a fuel distribution in the entire region of the fuel cell stack 100.

When the first channel 71 and the second channel 72 are disposed in parallel as described above, the auxiliary channel 73 may form the same angle with respect to the first channel 71 and the second channel. As an example, as the auxiliary channel 73 may be disposed perpendicular to both of the first channel 71 and the second channel 72, the entirety of the fuel path 70 may form a lattice structure.

In various embodiments of the present disclosure, the fuel path 70 may be variously disposed as described below.

As a specific example, as illustrated in FIG. 2 described above, any one first channel 71 is disposed in the central portion, and a pair of second channels 72 may be disposed at two sides of the one first channel 71 at positions spaced predetermined distances therefrom. In this case, the auxiliary channels 73 may be disposed at two sides of the first channel 71 so that the fuel is branched off in two side directions of the first channel 71. In this case, there is an advantage that the fuel is branched off in the two side directions of the first channel 71 to increase a speed of fuel supply.

As another example, as illustrated in FIG. 4, a fuel path 70 may be formed as a dense lattice structure by alternately arranging a plurality of first channels 71 and a plurality of second channels 72 and arranging a plurality of auxiliary channels 73 to connect the first channels and the second channels 72 which are adjacent to each other.

In this case, in order to prevent fuel moved to a side of the second channels 72 from being introduced into the adjacent auxiliary channels 73, a step having a predetermined height may be formed between the auxiliary channels 73 and the second channels 72.

When the plurality of first channels 71 and the plurality of second channels 72 are alternately disposed, an extension length of each of the auxiliary channels 73 may be minimized, diffusion of the fuel in porous members such as a current collector 50 and a cell 10 may be expedited, and thus uniformity of a fuel concentration can be maximized.

However, when the auxiliary channel 73 is extremely short as described above, a sufficient remaining time for which the fuel moves in a height direction may not be secured.

In order to supplement this point, as illustrated in FIG. 5, an auxiliary channel 73 of a fuel path 70 may be formed to include bent portions 74.

Specifically, the auxiliary channel 73 is not branched off from a first channel 71 to be directly connected to a second channel 72, as illustrated in FIG. 6, an extending direction of the auxiliary channel 73 may be changed at a region close to the second channel 72 through a first bent portion 84a, the auxiliary channel 73 may extend toward the first channel 71, and the extending direction may be changed again at a region close to the first channel 71 through a second bent portion 84b and may ultimately meet the second channel 72.

When the auxiliary channel 73 includes two bent portions 84a and 84b as described above, the auxiliary channel 73 may secure an extension length which is three times a distance a between the first channel and the second channel, and accordingly, a sufficient remaining time may be provided to allow fuel moving along the auxiliary channel 73 to move to a cell 10. At the same time, since the length of the auxiliary channel extending in a width direction may be minimized, there is an effect of maximizing diffusion in a current collector 50 and the cell 10 formed of porous materials.

As described above, in a fuel cell stack 100 according to the various embodiments, a distribution of a fuel concentration can be uniformed by separately forming the first channel 71 through which the fuel is introduced and the second channel 72 through which the fuel is discharged, and connecting the first channel 71 and the second channel 72 using the auxiliary channel 73 having the relatively short length to maximize diffusion of the fuel in regions of the cell 10 and the current collector 50 formed of the porous materials.

Figure 7:
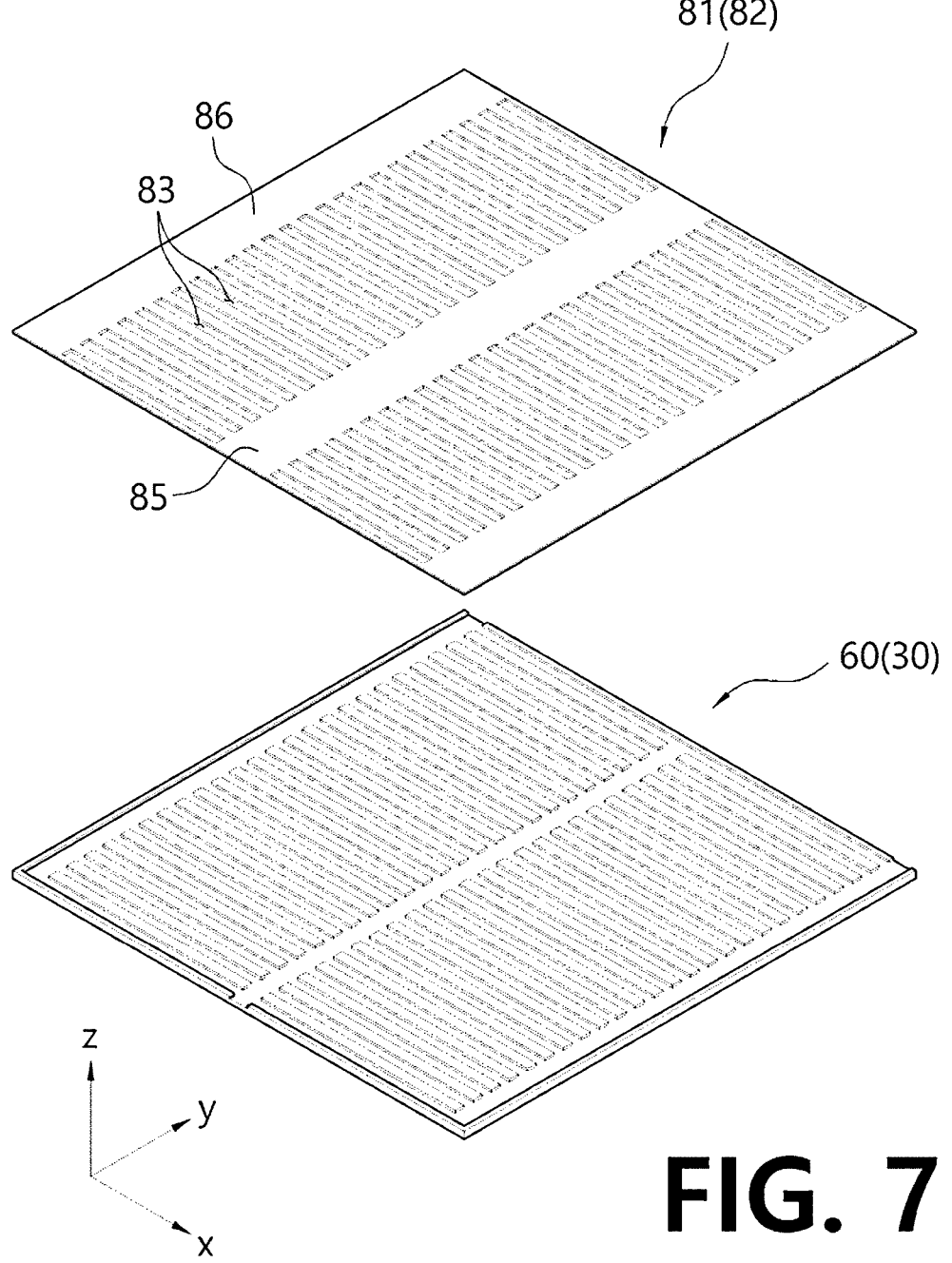
FIG. 7 is a view separately illustrating the fuel electrode separator (or air electrode separator) and a cover member of the fuel cell stack including a separator having a gas equal distribution structure according one embodiment of the present disclosure.
Figure 8:
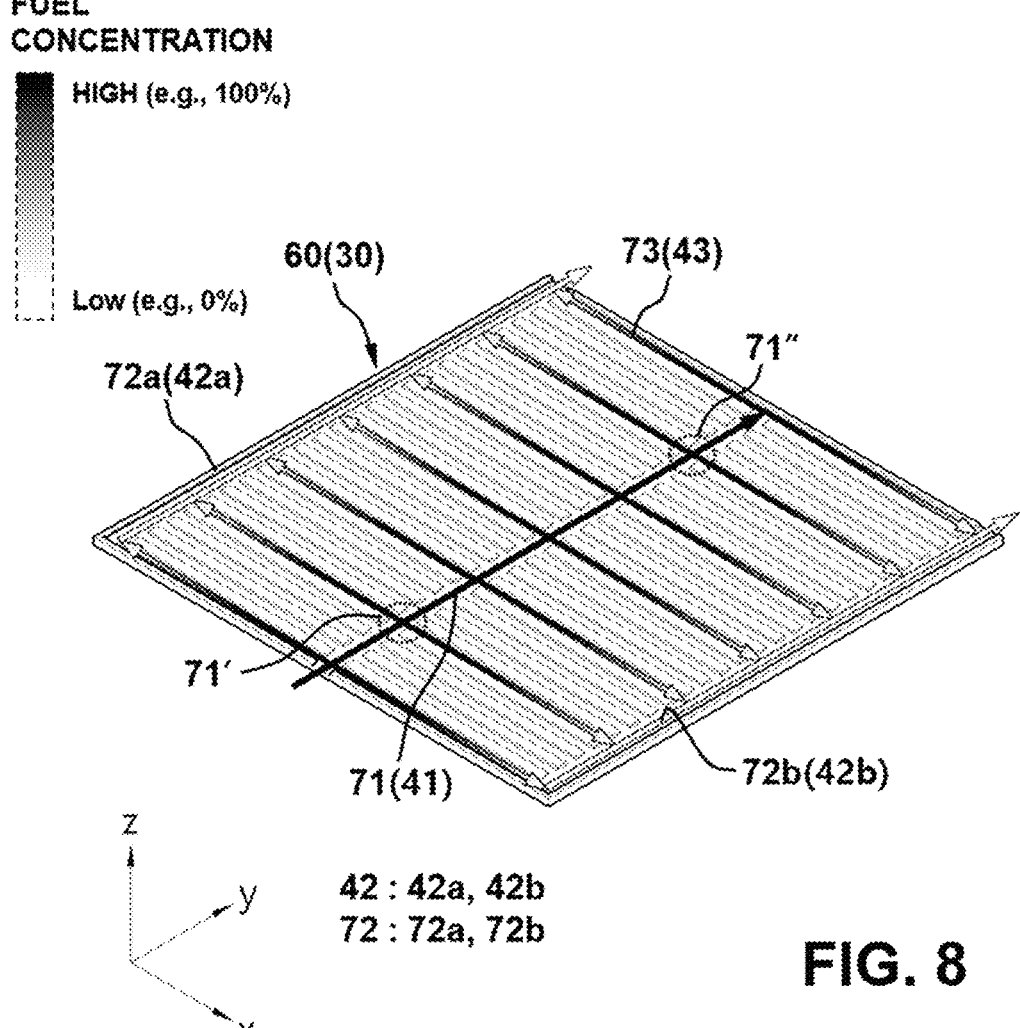
FIG. 8 is a view visually illustrating a fuel concentration for each channel of the fuel path formed in the fuel cell stack including a separator having a gas equal distribution structure according one embodiment of the present disclosure.

FIG. 7 is a view separately illustrating the fuel electrode separator (or air electrode separator) and a cover member of the fuel cell stack including a separator having a gas equal distribution structure according one embodiment of the present disclosure, and FIG. 8 is a view visually illustrating a fuel concentration for each channel of the fuel path formed in the fuel cell stack including a separator having a gas equal distribution structure according one embodiment of the present disclosure.

Meanwhile, in relation to the fuel path 70 in the fuel cell stack 100 according one embodiment of the present disclosure, fuel may move from the first channel 71 toward the cell 10 in the height direction, and the first channel 71 through which the fuel is introduced and moved may be formed so that the fuel is restricted from moving toward the cell 10.

Specifically, in the fuel cell stack 100 according one embodiment of the present disclosure, as illustrated in FIG. 7, as the cover member 81 is provided on the fuel electrode separator 60 in which the fuel path 70 is formed, movement of the fuel in the height direction may be blocked in a region 85 corresponding to the first channel 71 and a region 86 corresponding to the second channel 72 in the fuel path 70.

In this case, as an example, the cover member 81 may be formed so that an opening is formed in a region corresponding to the auxiliary channel 73 to allow movement of the fuel, and a region corresponding to the first channel 71 is covered.

More specifically, the fuel moved from the fuel path 70 to the cell 10 may generate water by reacting with air moved through the air electrode current collector 20 which will be described below, and in this case, the generated water may move into the fuel path 70 to reduce a concentration of the fuel. When the fuel of which the concentration is reduced is introduced through the auxiliary channel 73 as described above, the fuel concentration may be reduced over the entire region of the fuel cell stack 100 to cause degradation of the performance and durability of the fuel cell.

In the fuel cell stack 100 according one embodiment of the present disclosure, the fuel of the first channel 71 can be prevented from being diluted by water by arranging the cover member 81 between the fuel electrode separator 60 and the fuel electrode current collector 50 to prevent an upper portion of the first channel 71 from communicating with the current collector 50 and the cell 10.

In addition, the cover member 81 may solve a phenomenon that the reaction mainly occurs and the fuel is consumed most at the entrance of the fuel electrode separator 60. In other words, in the fuel cell stack 100 according one embodiment of the present disclosure, since electrical/thermal reaction may be prevented or allowed in some regions by the cover member 81, there is an effect that an engineer may freely control a reaction region.

In this case, referring to FIG. 8, an effect of the cover member 80 of the fuel cell stack 100 according one embodiment of the present disclosure may be more clearly seen.

As illustrated in FIG. 8, in one embodiment of the present disclosure, the first channel 71 may secure a uniform fuel concentration of almost 100% at both of an upper portion 71' close to the inlet 62 and a lower portion 71" far away from the inlet 62. This is because the upper portion of the first channel 71 may be spatially blocked by the cover member 81 to prevent water from being introduced from the cell 10.

In the fuel cell stack 100 according one embodiment of the present disclosure, as the uniform concentration is maintained in the longitudinal direction of the first channel 71 as described above, there is an effect of maintaining a uniform fuel concentration in the plurality of auxiliary channels 73 branched off from the first channel 71 regardless of positions spaced apart from the upper portion of the first channel 71.

Meanwhile, the cover member 81 may be formed to block the second channel 72 as well as the first channel 71 through which the fuel is introduced. In this case, the cover member 81 may effectively solve a phenomenon that the fuel concentration in the cell is diluted overall because the fuel diffuses from the second channel 72 through which fuel having a relatively low concentration flows.

As a specific example related to the cover member 81, as illustrated in FIG. 7, the cover member 81 may be a plate member manufactured separately from the fuel electrode separator 60. In this case, in the cover member 81 having the plate shape, slits 83 may be formed so that the fuel may move in a region corresponding to the auxiliary channel 73.

In embodiments, the slits may be formed to have a shape corresponding to the auxiliary channel 73. In addition, the cover member 81 having the plate shape may be coupled to the fuel electrode separator 60 by being inserted into an outer edge of the fuel electrode separator 60 so that the outer edge of the fuel electrode separator 60 and an outer edge of the cover member 81 are engaged with each other.

Meanwhile, unlike the example in which the fuel electrode separator 60 and the cover member 81 are separated from each other, the fuel electrode separator 60 and the cover member 81 may also be integrally formed. As an example, through a stacking manufacturing method using a three-dimensional (3D) printing, the fuel path 70 may be formed so that the upper portion of the first channel 71 is closed in the fuel electrode separator 60, and at the same time, an upper portion corresponding to the auxiliary channel 73 is opened.

In the fuel cell stack 100 according one embodiment of the present disclosure, a uniform and high fuel concentration can be secured overall by blocking the movement of the fuel in the height direction in the first channel 71 or the second channel 72 using the unique cover member 81.

Meanwhile, as described above, like the fuel electrode separator 60, in the air electrode separator 30, an air path 40 including a first channel 41 connected to an air inlet 32, a second channel 42 connected to an air outlet 34, and an auxiliary channel 43 connecting the first channel 41 and the second channel 42, and a separate cover member 21 may be provided, and thus air can be blocked from being moved in a direction from the first channel 41 to the cell 10.

According to embodiments, in a fuel cell stack including a separator having a gas equal distribution structure, a first channel through which fuel is introduced and a second channel through which the fuel is discharged are separately formed, and the first channel and the second channel are connected by an auxiliary channel having a relatively short length, and thus diffusion of the fuel in regions of a cell and a current collector which are formed of porous materials can be maximized.

Accordingly, in the fuel cell stack including a separator having a gas equal distribution structure according to the embodiment of the present disclosure, a distribution of a fuel concentration can be uniform in an entire region of the fuel cell stack.

In addition, in the fuel cell stack including a separator having a gas equal distribution structure according to the embodiment of the present disclosure, an electrochemical/thermochemical reaction can be induced or controlled to occur at a desired position in the fuel cell stack by blocking movement of fuel or air in a part of a channel through which the fuel or air moves using a unique cover member.

Accordingly, the fuel cell stack including a separator having a gas equal distribution structure according to the embodiment of the present disclosure can effectively solve a phenomenon that the electrochemical/thermochemical reaction is concentrated on one local region, which causes degradation of the performance and durability of the fuel cell stack.

Effects of the present disclosure are not limited to the above-described effects and should be understood to include all possible effects which may be inferred from the detailed description of the present disclosure or elements of the present disclosure described in the claims.

While embodiments of the present disclosure have been described above, the spirit of the present disclosure is not limited to the embodiments proposed in this specification, and other embodiments may be easily suggested by adding, changing and removing components by those skilled in the art and will fall within the spiritual range of the present disclosure.

What is claimed is:

1. A fuel cell stack including a separator having a gas equal distribution structure, the fuel cell stack comprising:
   a cell formed by sequentially stacking an air electrode, an electrolyte, and a fuel electrode;
   an air electrode current collector having one surface disposed at a side of the air electrode;
   an air electrode separator which is disposed at a side of the other surface of the air electrode current collector and in which an air path, along which air moves, is formed;
   a fuel electrode current collector having one surface disposed at a side of the fuel electrode; and
   a fuel electrode separator which is disposed at a side of the other surface of the fuel electrode current collector and in which a fuel path, along which fuel moves, is formed,
   wherein at least one of the air path and the fuel path includes:
      a first channel through which the air or the fuel is introduced from an outside and which is formed to extend to a predetermined length;
      an auxiliary channel branched off from the first channel so that the air or the fuel moves from the first channel; and
      a second channel connected to an end portion of the auxiliary channel and formed to extend to a predetermined length so that the air or the fuel moved from the auxiliary channel is moved and discharged to the outside, and at least one of the air path and the fuel path is formed such that the air or the fuel moves in a direction toward the cell and is restricted from moving from the first channel toward the cell,
wherein the first channel is formed to linearly extend in one direction,
wherein the air path or the fuel path is formed so that an upper portion thereof facing the cell is open, and
wherein the fuel cell stack further includes a cover member disposed between the air electrode separator and the air electrode current collector or between the fuel electrode separator and the fuel electrode current collector to cover a region corresponding to the first channel in the upper portion.

2. The fuel cell stack of claim 1,
wherein the auxiliary channel is provided as a plurality of auxiliary channels spaced at predetermined intervals in an extending direction of the first channel.

3. The fuel cell stack of claim 1, wherein the first channel and the second channel are disposed in parallel.

4. The fuel cell stack of claim 1, wherein the auxiliary channel is provided as a plurality of auxiliary channels disposed in parallel.

5. The fuel cell stack of claim 4, wherein the plurality of auxiliary channels are disposed orthogonal to the first channel and the second channel.

6. The fuel cell stack of claim 1, wherein the auxiliary channel extends to a length smaller than an extension length of each of the first channel and the second channel.

7. The fuel cell stack of claim 1, wherein:
the second channel is disposed at each of two sides of the first channel; and
the auxiliary channel is disposed at each of the two sides of the first channel so that the air or the fuel is distributed in two side directions of the first channel.

8. The fuel cell stack of claim 1, wherein:
the first channel is provided as a plurality of first channels;
the second channel is provided as a plurality of second channels; and
the plurality of first channels and the plurality of second channels are alternately disposed.

9. The fuel cell stack of claim 1, wherein the auxiliary channel is formed to include a bent portion which changes an extending direction.

10. The fuel cell stack of claim 1, wherein:
the cover member is formed in a plate shape manufactured separately from the air electrode separator or the fuel electrode separator; and
a slit is formed in the cover member so that the air or the fuel moves in a region corresponding to the auxiliary channel.

11. The fuel cell stack of claim 10, wherein the slit is formed in a shape corresponding to the auxiliary channel.

12. The fuel cell stack of claim 1, wherein the air electrode separator and the cover member or the fuel electrode separator and the cover member are integrally formed.

13. The fuel cell stack of claim 1, wherein at least one of the air path and the fuel path is formed so that the air or the fuel moves in the direction toward the cell through only the auxiliary channel.

14. The fuel cell stack of claim 1, wherein the fuel cell stack includes a fuel cell stack for a solid oxide fuel cell.

* * * * *